April 22, 1941.   F. I. KEANE   2,239,154
LOCKING DEVICE
Filed Oct. 18, 1938
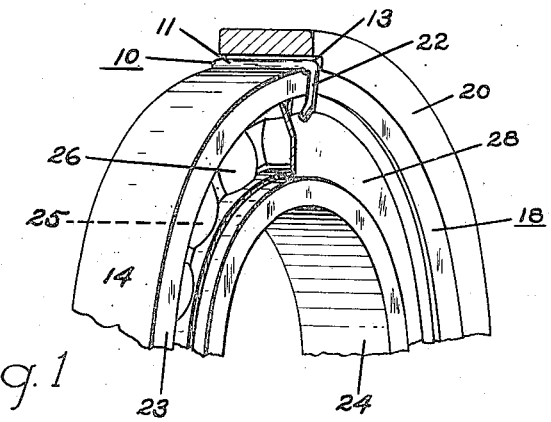
Fig. 1
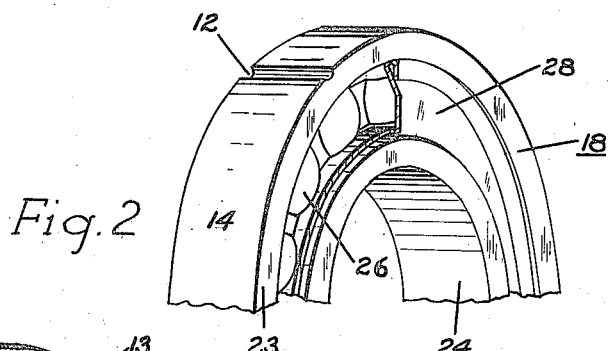
Fig. 2
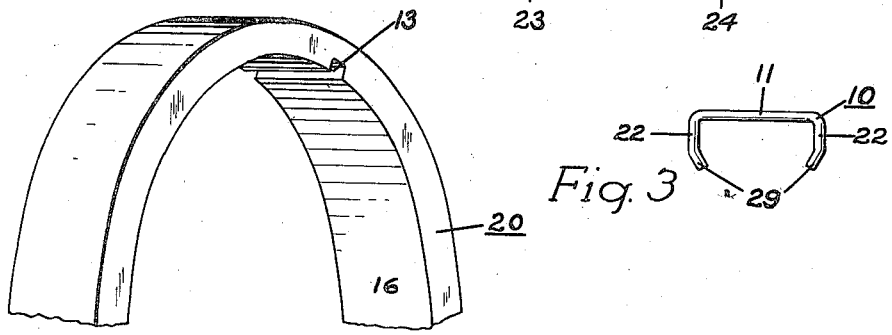
Fig. 3
Fig. 4
INVENTOR:
FRANK I. KEANE.
BY
HIS ATTORNEY.

Patented Apr. 22, 1941

2,239,154

UNITED STATES PATENT OFFICE 2,239,154

LOCKING DEVICE

Frank I. Keane, Detroit, Mich., assignor to General Motors Corporation, Detroit, Mich., a corporation of Delaware Application October 18, 1938, Serial No. 235,617

2 Claims. (Cl. 308—236)

My invention relates to locking devices and is particularly adapted for bearings and their mountings.

An object is to provide an improved means for demountably and non-rotatably securing a bearing or other cylindrical member within a seat. Another object is to provide an inexpensive, simply constructed, and highly efficient locking device which may be easily secured in unit-handling relation with one of a pair of telescoping members, and which will easily enter into keyed relation with both of the telescoping members.

To these ends, and also to improve generally upon devices of the character indicated, my invention consists in the various matters hereinafter described and claimed.

In the accompanying drawing:

Figure 1 is a fragmentary perspective view showing an antifriction bearing locked in its seat in accordance with my invention;

Figure 2 is a fragmentary perspective view of the bearing with the locking device removed;

Figure 3 is a perspective view of my locking clip; and

Figure 4 is a fragmentary perspective showing of the seat member which receives the bearing.

In my locking device, which is particularly adapted for non-rotatably securing a bearing within its seat, a locking clip 10, illustrated as a round wire which may be easily bent to shape, has an intermediate straight body portion 11 that forms a key matingly and slidably received in both of the cooperating opposed grooves 12 and 13 respectively extending across the outer and the inner cylindrical faces 14 and 16 of the telescopingly fitted inner and outer members 18 and 20. The end portions of the clip are laterally bent towards each other into substantially parallel arms 22 that overlie and preferably clamp against the opposite sides of one of the telescoping members to secure the clip in unit-handling relation with this member, and to effectively prevent the clip from sliding out of the locked position within the opposed grooves 12 and 13 while the telescoping members 18 and 20 are in interfitted relation.

In the present embodiment, the inner member 18 is shown as the outer race ring of an antifriction bearing which is provided with the inner race ring 24 and with the usual bearing balls 25 mounted in the separator 26. The outer member 20 is shown as a sleeve which may be mounted in any suitable manner in a housing or other support. A lubricant is maintained in the bearing by the shields 28 that close the ends of the bearing. These shields may be of any suitable construction, such, for example, as disclosed in the United States Patent Number 1,917,988, issued to Large on July 11, 1933. The arms 22, which are preferably in clamped engagement with the opposite sides 23 of the race ring 18, have their outer ends 29 bent-over towards each other to lie within the race ring 18 and against the shields 28 to aid in securing the clip in position and to conveniently locate these clip ends out of obstructing positions.

The clip 10 is initially bent with the depending arms 22 spaced sufficiently to permit the clip to be located in its seated position after which the ends 29 and the arms 22 are further bent towards each other and within the race ring 18 to lock the clip in unit-handling relation with this race ring. I preferably make the wire clip 10 of a sufficiently soft material so that this clip will shear and permit the outer race ring 18 to turn in the seat member 20 if the race rings 18 and 24 should become locked against relative rotation due to overheating of the bearing or other causes. This shearing of the clip 10 usually will prevent breakage of the bearing or other parts which it may support.

I claim:

1. In a bearing or the like, a race-ring having a groove extending across its seat engaging surface, and a projecting key received in said groove and having its end portions bent to extend upon opposite sides of said ring; substantially as described.

2. In a bearing or the like, a race-ring having a groove extending across its seat engaging surface, and a projecting key received in said groove and having its end portions bent around the opposite edges of said ring, to become unit-handling therewith; substantially as described.

FRANK I. KEANE.